(12) United States Patent
Suzuki et al.

(10) Patent No.: US 8,366,968 B2
(45) Date of Patent: Feb. 5, 2013

(54) METHODS OF MANUFACTURING ACTIVE MATERIAL AND ELECTRODE, ACTIVE MATERIAL, AND ELECTRODE

(75) Inventors: Hisashi Suzuki, Tokyo (JP); Masayoshi Hirano, Tokyo (JP)

(73) Assignee: TDK Corporation, Tokyo (JP)

( * ) Notice: Subject to any disclaimer, the term of this patent is extended or adjusted under 35 U.S.C. 154(b) by 118 days.

(21) Appl. No.: 12/787,496

(22) Filed: May 26, 2010

(65) Prior Publication Data

US 2010/0301284 A1 Dec. 2, 2010

(30) Foreign Application Priority Data

May 29, 2009 (JP) ................. P2009-131063

(51) Int. Cl.
*H01B 1/00* (2006.01)
(52) U.S. Cl. ............... 252/500; 429/231.3; 429/231.95; 429/232; 429/322; 361/271
(58) Field of Classification Search .................. 252/500; 148/247; 428/404, 450; 429/231.3, 231.95, 429/232, 322; 361/271
See application file for complete search history.

(56) References Cited

U.S. PATENT DOCUMENTS

| | | | |
|---|---|---|---|
| 5,856,009 A | 1/1999 | Nishio et al. | |
| 6,106,966 A | 8/2000 | Crow | |
| 6,395,426 B1 | 5/2002 | Imachi et al. | |
| 6,730,435 B1 | 5/2004 | Nakane et al. | |
| 2002/0012804 A1* | 1/2002 | Heimann et al. | 428/450 |
| 2002/0127473 A1* | 9/2002 | Ooya et al. | 429/232 |
| 2006/0007629 A1* | 1/2006 | Takeda et al. | 361/271 |
| 2006/0057466 A1* | 3/2006 | Suhara et al. | 429/322 |
| 2006/0071198 A1* | 4/2006 | Paulsen et al. | 252/500 |
| 2006/0166100 A1 | 7/2006 | Takahashi et al. | |
| 2006/0185769 A1* | 8/2006 | Nakayama et al. | 148/247 |
| 2006/0263690 A1* | 11/2006 | Suhara et al. | 429/231.3 |
| 2007/0224506 A1* | 9/2007 | Ooyama et al. | 429/231.3 |
| 2008/0044727 A1 | 2/2008 | Suzuki et al. | |
| 2008/0113271 A1* | 5/2008 | Ueda et al. | 429/231.95 |
| 2009/0200509 A1 | 8/2009 | Suzuki et al. | |
| 2009/0226725 A1* | 9/2009 | Myeong et al. | 428/404 |
| 2010/0181540 A1 | 7/2010 | Suzuki | |

FOREIGN PATENT DOCUMENTS

| | | |
|---|---|---|
| CN | 1294417 A | 5/2001 |
| CN | 1726304 A | 1/2006 |
| CN | 101127399 A | 2/2008 |
| CN | 101258264 A | 9/2008 |
| JP | A-4-319260 | 11/1992 |
| JP | A-7-288127 | 10/1995 |

(Continued)

OTHER PUBLICATIONS

Jun. 14, 2012 Office Action issued in U.S. Appl. No. 12/204,340.

(Continued)

*Primary Examiner* — Khanh Tuan Nguyen
(74) *Attorney, Agent, or Firm* — Oliff & Berridge, PLC

(57) ABSTRACT

An active material, an electrode, and a battery which exhibit high safety in overcharging tests, and methods of manufacturing them are provided. The active material comprises a first metal oxide particle 1 and a second metal oxide particle group 2 attached to a surface of the first metal oxide particle 1. The second metal oxide is at least one selected from the group consisting of zirconia, silica, and tin oxide. The first metal oxide particle 1 contains fluorine atoms from its surface to deepest part.

5 Claims, 15 Drawing Sheets

FOREIGN PATENT DOCUMENTS

| | | |
|---|---|---|
| JP | A-2000-200605 | 7/2000 |
| JP | A-2002-248163 | 9/2002 |
| JP | A-2005-85635 | 3/2005 |
| JP | A-2005-276454 | 10/2005 |
| JP | A-2006-107763 | 4/2006 |
| WO | WO 2004/030126 A1 | 4/2004 |
| WO | WO 2005/028371 A1 | 3/2005 |
| WO | WO 2005/119820 A1 | 12/2005 |
| WO | WO 2007/029933 * | 3/2007 |

OTHER PUBLICATIONS

Chen et al., "Studies of $LiCoO_2$ Coated with Metal Oxides," Electrochemical and Solid-State Letters, 2003, pp. A221-A224, vol. 6, No. 11, The Electrochemical Society, Inc., Canada.

Chen et al., "Methods to obtain excellent capacity retention in $LiCoO_2$ cycled to 4.5 V," Electrochemica Acta, 2004, pp. 1079-1090, vol. 49, Elsevier Ltd., Canada.

Kannan et al., "High Capacity Surface-Modified $LiCoO_2$ Cathodes for Lithium-Ion Batteries," Electrochemical and Solid-State Letters, 2003, pp. A16-A18, vol. 6, No. 1, The Electrochemical Society, Inc., USA.

Office Action issued in U.S. Appl. No. 12/689,540; mailed Feb. 14, 2012.

Office Action issued in Chinese Patent Appln. No. 200810146776.9; mailed Nov. 12, 2010.

Office Action issued in U.S. Appl. No. 12/204,340; mailed May 12, 2011.

Office Action issued in U.S. Appl. No. 12/204,340; mailed Nov. 25, 2011.

Cho et al., "Zero-Strain Intercalation Cathode for Rechargeable Li-Ion Cell," Angewandte Chemie International Edition, 2001, pp. 3367-3369, vol. 40, No. 18, Wiley-VCH Verlag GmbH, Germany.

Myung et al., "Role of Alumina Coating on Li-Ni-Co-Mn-O Particles as Positive Electrode Material for Lithium-Ion Batteries," Chemistry of Materials, 2005, pp. 3695-3704, vol. 17, No. 14, American Chemical Society, United States.

Myung et al., "Functionality of Oxide Coating for $Li[Li_{0.05}Ni_{0.4}Co_{0.15}Mn_{0.4}]O_2$ as Positive Electrode Materials for Lithium-Ion Secondary Batteries," The Journal of Physical Chemistry, 2007, pp. 4061-4067, vol. 111, No. 10, American Chemical Society, United States.

Dictionary of Geology and Mineralogy ($2^{nd}$ Edition), 2003, p. 33, McGraw-Hill.

Patnaik, Pradyot, Handbook of Inorganic Chemicals, 2003, p. 1001, McGraw-Hill.

U.S. Appl. No. 12/689,540, filed Jan. 19, 2010.

U.S. Appl. No. 12/204,340, filed Sep. 4, 2008.

* cited by examiner (a)

6Li (b)

7Li (c)

Li₂F (d)

K (a)

⁶Li (b)

⁷Li (c)

Li₂F (d)

K (a)

C (b)

O (c)

OH (d)

F (a)

⁶Li (b)

⁷Li (c)

Li₂F (d)

K (a) ⁶Li (b) ⁷Li (c) Li₂F (d) K

METHODS OF MANUFACTURING ACTIVE MATERIAL AND ELECTRODE, ACTIVE MATERIAL, AND ELECTRODE

BACKGROUND OF THE INVENTION

1. Field of the invention

The present invention relates to methods of manufacturing an active material and an electrode which are used in chargeable electrochemical devices such as lithium-ion secondary batteries and electric double-layer capacitors, and the active material and electrode manufactured by these manufacturing methods.

2. Related Background Art

In order to improve the cycle characteristic and safety of positive electrode active materials in lithium-ion secondary batteries, it has recently been tried to add F (elemental fluorine) to the surfaces of the positive electrode active materials.

For example, patent literature 1 discloses a particulate lithium-ion secondary battery positive electrode material represented by a general formula of $Li_aCo_bA_cB_dO_eF_f$ (where A is Al or Mg, B is a group IV transition element, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 \leq f \leq 0.02$, and $0.0001 \leq c+d \leq 0.03$), in which elemental A, elemental B, and fluorine evenly exist in the vicinity of particle surfaces.

Patent literature 2 discloses a lithium-nickel-cobalt-manganese-fluorine-containing composite oxide having an R-3m rhombohedral structure represented by a general formula $Li_pNi_xMn_{1-x-y}Co_yO_{2-q}F_q$ (where $0.98 \leq p \leq 1.07$, $0.3 \leq x \leq 0.5$, $0.1 \leq y \leq 0.38$, and $0 < q \leq 0.05$), in which the half-width of the diffraction peak of a (110) plane whose $2\Theta$ is $65\pm0.5°$ in the X-ray diffraction using a Cu—Kα line is 0.12 to 0.25°. Its paragraph [0050] states: "In the lithium-nickel-cobalt-manganese-fluorine-containing composite oxide of the present invention, a mixture to which a fluorine compound is added in addition to the lithium compound is used for firing. Examples of the fluorine compound include lithium fluoride, ammonium fluoride, magnesium fluoride, nickel fluoride, and cobalt fluoride. A fluorinating agent, such as fluorine chloride, fluorine gas, hydrogen fluoride gas, or nitrogen trifluoride can also be allowed to react" Its paragraph [0020] states: "In the present invention, it is preferable that fluorine atoms are eccentrically located on the outer-layer portion of the lithium-nickel-cobalt-manganese-fluorine-containing composite oxide. The presence of the fluorine atoms located evenly in the particles of the composite oxide is not preferable because the effect of the present invention is difficult to develop."

Citation List
Patent Literature 1: WO20041030126 pamphlet
Patent Literature 2: WO02005/028371 pamphlet

SUMMARY OF THE INVENTION

Further safety is desired when batteries are overcharged.

In view of the problem mentioned above, it is an object of the present invention to provide an active material, an electrode, and a battery which exhibit higher safety when overcharged, and methods of manufacturing them.

The active material in accordance with the present invention comprises a particle of a first metal oxide and a particle group of a second metal oxide attached to a surface of the particle of the first metal oxide. The second metal oxide is at least one selected from the group consisting of zirconia, silica, and tin oxide, while the particle of the first metal oxide contains fluorine atoms from a surface thereof to a deepest part thereof.

An electrochemical device using such an active material yields better safety than that conventionally available in overcharging.

Preferably, the particle of the first metal oxide exhibits a peak of $-201.54$ ppm$\pm10$ ppm when a $^{19}F$ nucleus thereof is measured by solid-state NMR.

An electrochemical device using such an active material yields further better safety in overcharging.

Preferably, the fluorine content is 0.04 to 2.0 mass % in the total mass of the first metal oxide particle and the second metal oxide particle group, while the second metal oxide particle group content is 0.1 to 3.0 mass % in the total mass of the first metal oxide particle and the second metal oxide particle group. Satisfying this enhances the safety in overcharging in particular.

The first metal oxide as an active material is preferably a lithium-containing metal oxide, more preferably $LiMn_{2-x}Al_xO_4$ (where $0 \leq x < 2$), $LiCo_xNi_yMn_{1-x-y}O_2$ (where $0 \leq x \leq 1$ and $0 < y \leq 0.36$), or $LiNi_xCo_yAl_{1-x-y}O_2$ (where $0 < x \leq 1$ and $0 \leq y < 1$).

The electrode of the present invention has the above-mentioned active material.

The foregoing active material and electrode can favorably be manufactured by the following methods:

The method of manufacturing an active material in accordance with the present invention comprises the step of bringing a particle of a first metal oxide into contact with an aqueous solution containing a fluoro complex of at least one metal selected from the group consisting of zirconium, silicon, and tin in a vessel made of a polymer.

The method of manufacturing an electrode in accordance with the present invention comprises the step of bringing an electrode comprising an active material layer containing a particle of a first metal oxide, a conductive auxiliary, and a binder into contact with an aqueous solution containing a fluoro complex of at least one metal selected from the group consisting of zirconium, silicon, and tin in a vessel made of a polymer.

These can favorably manufacture the above-mentioned active material and electrode.

The present invention provides an active material and an electrode which can sufficiently enhance safety when overcharged and methods of manufacturing them.

DESCRIPTION OF THE PREFERRED EMBODIMENTS

Figure 1:
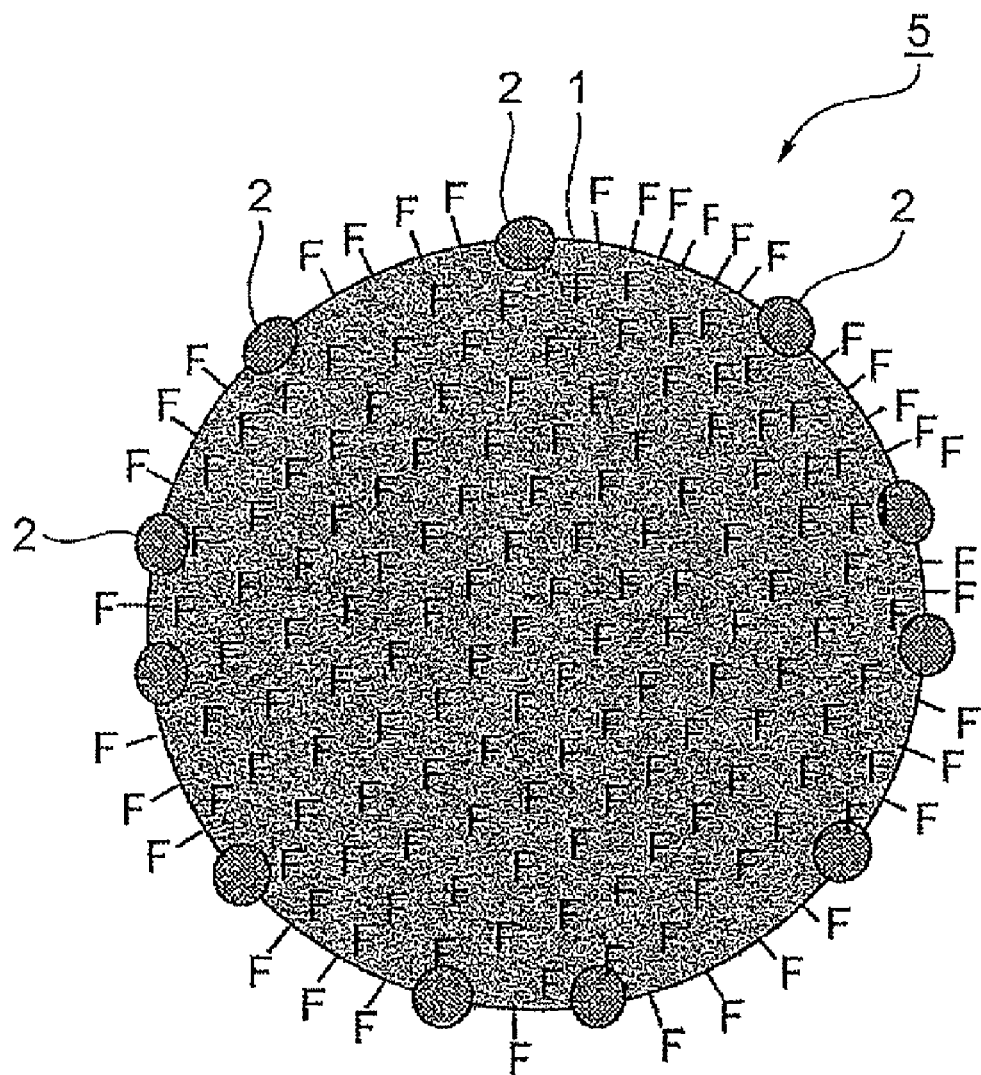
FIG. 1 is a schematic sectional view of the active material in accordance with an embodiment.

In the following, preferred embodiments of the present invention will be explained in detail with reference to the accompanying drawings. In the explanation of the drawings, the same or equivalent constituents will be referred to with the same signs, while omitting their overlapping descriptions. Ratios of dimensions in the drawings do not always match those in practice.

First Embodiment

As illustrated in FIG. 1, the positive electrode active material in accordance with the first embodiment is an active material 5 comprising a particle 1 of a first metal oxide and a particle group 2 of a second metal oxide attached to its surface.

The first metal oxide is preferably a lithium-containing metal oxide, though not limited in particular as long as it functions as an active material of a positive electrode. Preferred examples of the lithium-containing metal oxide include metal oxides containing Li and at least one metal selected from the group consisting of Co, Ni, Mn, and Al such as $LiMn_2O_4$, $LiMn_{2-x}Al_xO_4$ (where 0<x<2), $LiMO_2$ (where M is Co, Ni, or Mn), $LiCo_xNi_{1-x}O_2$, $LiCo_xNi_yMn_{1-x-y}O_2$ (where $0 \leq x \leq 1$ and $0 < y \leq 0.36$), and $LiNi_xCo_yAl_{1-x-y}O_2$ (where $0 < x \leq 1$ and $0 \leq y < 1$). Preferred in particular are $LiNi_{1/3}Mn_{1/3}Co_{1/3}O_2$ and $Li_{0.8}Co_{0.15}Al_{0.05}$. Also preferred is $Li_4Ti_5O_{12}$.

The particle size of the first metal oxide particle 1 is preferably about 0.5 to 30 μm, though not limited in particular.

As illustrated in FIG. 1, the first metal oxide particle 1 contains fluorine atoms from its surface to deepest part. Here, the deepest part refers to the center of the particle when it is spherical or the part farthest from the surface of the particle when it is irregular, e.g., hollow. In short, F exists throughout a cross section of the first metal oxide particle in this embodiment.

The second metal oxide is at least one selected from the group consisting of zirconia ($ZrO_2$), silica ($SiO_2$), and tin oxide ($SnO_2$, SnO, or the like). While the second metal oxide particle group 2 may contain F, the mass of the second metal oxide is typically much lower than that of the first metal oxide, so that the amount of F occupied by the second metal oxide is small in the total F content in the active material.

Preferably, the average particle size of the second metal oxide particle group 2 is 100 inn or less. When the average particle size of the second metal oxide particle group is 100 nm or less, the effect of improving the overcharging characteristic tends to be easier to occur. Here, the particle size of the second metal oxide particle refers to its diameter in a direction extending along the surface of the first metal oxide particle but not in the thickness direction thereof Such a diameter can easily be measured according to a high-resolution cross-sectional electron microgram, and an average particle size can readily be acquired by averaging by the number.

Though not limited in particular, the fluorine content and the second metal oxide particle group content in the total mass of the first metal oxide particle 1 and second metal oxide particle group 2 are preferably 0.04 to 2.0 mass % and 0.1 to 3.0 mass %, respectively. Their concentrations can typically be calculated as average amounts in the active material containing a number of first metal oxide particles. This is effective in yielding further better safety in overcharging tests.

The second metal oxide particle group 2 is typically attached to the surface of the first metal oxide particle 1 such as to cover it partly, but may form a layer covering the whole surface of the first metal oxide particle L The thickness of this layer 2a is 1 to 200 nm, for example, preferably 10 to 100 nm, though not limited in particular.

The average particle size of the second metal oxide particle group, the ratio of the mass of the second metal oxide particle group 2 to the total mass of the first metal oxide particle 1 and the second metal oxide particle group 2, whether or not to form the layer 2a, and the thickness of the layer 2a can easily be controlled by setting the contact time between the first metal oxide particle 1 and the aqueous solution, temperature, concentrations of the metal fluoro complex and scavenger, and pH of the aqueous solution to their appropriate values.

Electrochemical Device

An outline of a lithium-ion secondary battery as an electrochemical device using such a positive electrode active material will now be explained in brief with reference to FIG. 2.

This lithium-ion secondary battery 100 mainly comprises a multilayer body 30, a case 50 accommodating the multilayer body 30 in a sealed state, and a pair of leads 60, 62 connected to the multilayer body 30.

The multilayer body 30 is one in which a pair of electrodes 10, 20 are arranged such as to oppose each other while interposing a separator 18 therebetween. The positive electrode 10 is one in which a positive electrode active material layer 14 is disposed on a positive electrode current collector 12. The negative electrode 20 is one in which a negative electrode active material layer 24 is disposed on a negative electrode current collector 22. The positive electrode active material layer 14 and negative electrode active material layer 24 are in contact with the separator 18 on both sides, respectively. Leads 60, 62 are connected to respective end portions of the negative electrode current collector 22 and positive electrode current collector 12 and have respective end portions extending to the, outside of the case 50. The positive electrode active material layer 14 contains the above-mentioned positive electrode active material, a binder, and a necessary amount of a conductive auxiliary. The negative electrode active material layer 24 contains a desirable negative electrode active material, a binder, and a necessary amount of a conductive auxiliary.

Methods of Manufacturing Positive Electrode Active Material and Positive Electrode First Embodiment The first embodiment of methods of manufacturing the above-mentioned positive electrode active material and positive electrode will now be explained. This embodiment forms a positive electrode active material comprising the first metal oxide particle and the second metal oxide particle group attached to its surface, and then makes a positive electrode by using the positive electrode active material.

Making of the Positive Electrode Active Material

First, the above-mentioned first metal oxide particle is prepared. Subsequently, an aqueous solution containing a metal fluoro complex is prepared. The metal in the metal fluoro complex is at least one selected from the group consisting of zirconium, silicon, and tin.

A specific example of the metal fluoro complex is at least one selected from the group consisting of fluorozirconic acid ($H_2ZrF_6$), fluorosilicic acid ($H_2SiF_6$), their salts, and tin fluoride ($SnF_2$ or $SnF_4$).

Examples of salts of the metal fluoro complex include potassium, calcium, and ammonium salts, specific examples of which include $K_2ZrF_6$, $K_2SiF_6$, $CaZrF_6$, $CaSiF_6$, $(NH_4)_2ZrF_6$, and $(NH_4)_2SiF_6$.

Such a metal fluoro complex can also be obtained by dissolving a metal compound which is not a fluoro complex into an aqueous hydrofluoric acid (HF) solution, an aqueous ammonium hydrogen fluoride ($NH_4F \cdot HF$) solution, or the like, for example. For instance, dissolving iron oxide-hydroxide (FeOOH) or cobalt hydroxide ($Co(OH)_2$) into an aqueous $NH_4F \cdot HF$ solution yields a metal fluoro complex such as $FeF_6^{3-}$ or $CoF_6^{4-}$ therein, which is usable in the present invention.

Preferably, the metal fluoro complex concentration in the aqueous solution is about 0.001 to 1 M. Here, M=mol/L.

Preferably, the aqueous solution contains a scavenger which can pull out fluoride ions ($F^-$) from the metal fluoro complex. Surface modification can be carried out rapidly when the scavenger is added.

Examples of the scavenger include boric acid ($H_3BO_3$), aluminum (Al), ferrous chloride ($FeCl_2$), ferric chloride ($FeCl_3$), sodium hydroxide (NaOH), ammonia ($NH_3$), titanium (Ti), iron (Fe), nickel (Ni), magnesium (Mg), copper (Cu), zinc (Zn), silicon (Si), silicon dioxide ($SiO_2$), calcium oxide (CaO), bismuth oxide ($Bi_2O_3$), aluminum oxide ($Al_2O_3$), and magnesium oxide (MgO).

When using boric acid, its concentration is preferably about 0.001 to 1 M in the processing solution.

Then, the first metal oxide particle is brought into contact with the aqueous solution containing the metal fluoro complex. Specifically, the first metal oxide particle is put into the aqueous solution containing the metal fluoro complex, and they are stirred and so forth when necessary. Preferably, at this time, the first metal oxide particle and the aqueous solution containing the metal fluoro complex are brought into contact with each other in a vessel made of a polymer. This is because fluorine is hard to attach to the vessel made of a polymer, and thus is easy to be added into the first metal oxide particle from its surface to deepest part. Examples of the polymer to become a material for the vessel include polyethylene, polypropylene, and polytetrafluoroethylene, though not limited in particular. Preferably, the vessel is closed during the contacting operation. This can inhibit fluorine from scattering as a gas, whereby fluorine can be added into the first metal oxide particle from its surface to deepest part more easily.

Though they may be brought into contact with each other within a vessel other than that made of a polymer, the fluorine component may be consumed by the vessel in this case and fail to be added to the deepest part within the first metal oxide particle.

Instead of mixing the aqueous metal fluoro complex solution and boric acid together from the start at the time of contacting, the first metal oxide particle may be dispersed in an aqueous boric acid solution before adding the aqueous metal fluoro complex solution dropwise thereto.

The following reactions occur in such contact. Letting M be a metal ion, for example, an equilibrium reaction of

  (1)

occurs in the aqueous solution. When $H_3BO_3$ or Al as a scavenger exists,

  (2)

  (3)

thus shifting the equilibrium of equation (1) to the right side.

Specifically, boric acid reacts with fluoride ions as in equation (2), so as to yield $HBF_4$. When the fluoride ions are consumed, the equilibrium of equation (1) shifts rightward, thereby promoting the production of $MO_n$ which is the second metal oxide. Al also reacts with fluoride ions as in equation (3), so as to yield $H_3AlF_6$. As a result, the equilibrium in equation (1) shifts to such a direction as to produce $MO_n$ which is the second metal oxide.

Such processing yields the active material 5 in which the second metal oxide particle group 2 is attached to the surface of the first metal oxide particle 1 as illustrated in FIG. 1. Here, the second metal oxide is an oxide of a metal derived from the metal fluoro complex and differs from the first metal oxide. Fluoride ions are taken by the first metal oxide, whereby fluorine atoms can be added into the first metal oxide particle from its surface to deepest part.

Preferably, the pH of the aqueous solution at the time of forming the second metal oxide particle group is 4 to 12. During forming the particle group, the pH of the aqueous solution typically fluctuates because of the pH drop caused by the generation of $H^+$ in equation (1), for example. The first metal oxide may dissolve when the pH is less than 4, whereas the metal ion of the metal fluoro complex in the aqueous solution may precipitate as a hydroxide when the pH exceeds 12. Therefore, keeping the pH of the aqueous solution within the range of 4 to 12 can favorably form the second metal oxide particle group on the first metal oxide particle. The pH of the aqueous solution at the time of forming the particle group may be kept within the above-mentioned range by defining the pH of the aqueous solution before forming the particle group while predicting the width of fluctuation of pH such that the pH at the time of ending forming the particle group falls within the above-mentioned range, adding an acid (hydrochloric acid) or a base (ammonia water) during forming the particle group, and so forth.

When the battery active material 5 in which the second metal oxide particle group 2 is formed on the surface of the first metal oxide particle I while fluoride is added to the first metal oxide particle from its surface to deepest part is obtained by such processing, the aqueous solution and the active material 5 are separated from each other by filtering or the like, and the active material 5 is washed with water or the like and then dried. The dried active material 5 is further heat-treated when necessary. This aims at enhancing the crystallinity of the second metal oxide. Enhancing the crystallinity of the second metal oxide inhibits the electrolytic solution from decomposing on the surface of the first metal oxide particle 1 and makes it easier to improve the cycle characteristic.

The heat treatment temperature is preferably 500 to 900° C., though not limited in particular. This can favorably monocrystallize second metal oxide particles. The heat-treatment atmosphere is preferably an air atmosphere, though not limited in particular. Monocrystallization makes it easier to improve the cycle characteristic.

Manufacture of the Positive Electrode

Subsequently, using thus obtained active material 5, the electrode 10 is made. First, a binder, the current collector 12, and a conductive auxiliary are prepared.

Any known binder can be used without limitation in particular as long as it can bind the above-mentioned battery active material and conductive auxiliary to the current collector. Examples of the binder include fluororesins such as polyvinylidene fluoride (PVDF) and polytetrafluoroethylene (FIFE) and mixtures of styrene/butadiene rubber (SBR) and water-soluble polymers (e.g., carboxymethylcellulose, polyvinyl alcohol, sodium polyacrylate, dextrins, and glutens).

Next, the current collector 12 is prepared. An example of the current collector 12 is a foil made of aluminum.

Examples of the conductive auxiliary include carbon materials such as carbon black; powders of metals such as nickel, stainless steel, and iron; mixtures of the carbon materials and fine powders of metals; and conductive oxides such as ITO.

Then, the above-mentioned active material 5, binder, and conductive auxiliary are added to a solvent, so as to prepare a slurry. Examples of the solvent include N-methyl-2-pyrrolidone and water.

Figure 2:
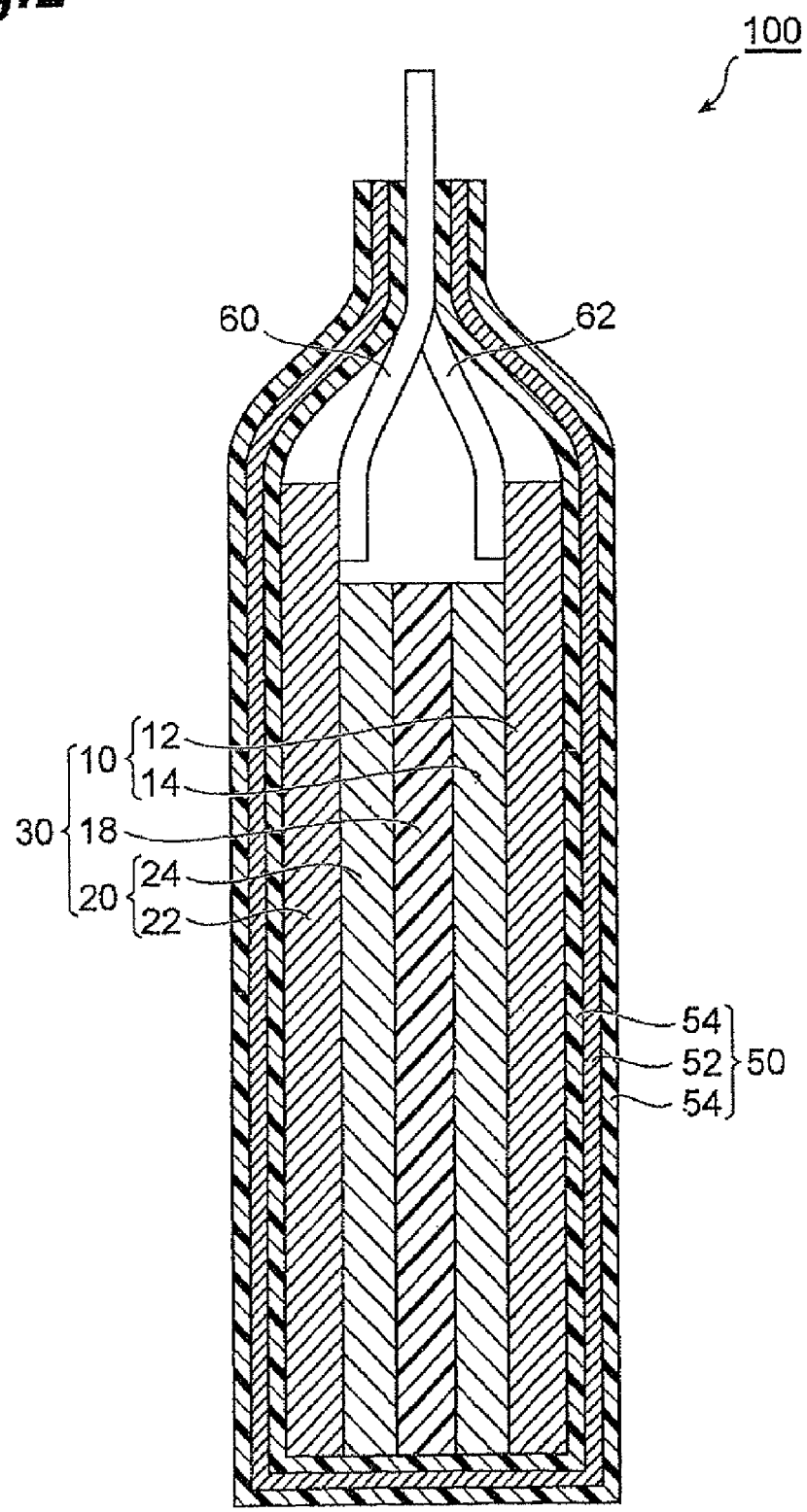
FIG. 2 is a schematic sectional view for explaining a lithium-ion secondary battery as the electrochemical device in accordance with an embodiment.

The slurry containing the active material, binder, and the like is applied to the surface of the current collector 12, dried, and rolled, whereby the positive electrode 10 comprising the positive electrode current collector 12 and the positive electrode active material 14 is completed as illustrated in FIG. 2.

The positive electrode active material 5 and positive electrode 10 in accordance with this embodiment use the active material 5 having the second metal oxide particle group 2 on the surface of the first metal oxide particle 1, in which the second metal oxide is at least one selected from the group consisting of zirconia, silica, and tin oxide, while the first metal oxide particle 1 contains fluorine atoms from its surface to deepest part. This can achieve a battery exhibiting high safety even when overcharged. Though it is not clear why such effects are obtained by the active material 5 in accordance with this embodiment, it seems that, since the specific second metal oxide particle group 2 is formed on the surface of the first metal oxide particle 1 while the first metal oxide particle 1 contains fluorine from its surface to center, even when the active material is overcharged and decomposed to generate oxygen gas, fluoride exists so as to surround the oxygen gas, thereby inhibiting the electrolytic solution and the oxygen gas from coming into direct contact with each other, which makes it harder for the electrolytic solution to burn and explode, for example.

Second Embodiment

The second embodiment of methods of manufacturing a positive electrode active material and a positive electrode will now be explained. This embodiment manufactures the positive electrode 10 having the positive electrode active material layer 14 by using the first metal oxide particle 1 not in contact with the aqueous solution containing the metal fluoro complex yet and then brings the positive electrode 10 into contact with the aqueous solution containing the metal fluoro complex, thereby forming the second metal oxide particle group 2 on the surface of the first metal oxide particle 1 in the positive electrode active material layer 14. That is, the first metal oxide particle 1 in the positive electrode active material layer 14 is processed while in the state of an electrode.

The method of manufacturing the positive electrode 10 is the same as that in the first embodiment except for the use of the first metal oxide particle not in contact with the aqueous solution containing the metal fluoro complex yet. The aqueous solution containing the metal fluoro complex brought into contact with the positive electrode 10 is the same as that in the first embodiment. The contacting condition may be the same as that in the first embodiment. In particular, when the current collector 12 of the positive electrode 10 is Al, Al acts as a scavenger, thereby making it easier to promote the generation of the second metal oxide and the addition of fluorine to the first metal oxide particle. When Al acting as a current collector is used as a scavenger, Al as the current collector may corrode, though not to such an extent that its function as the current collector is lost.

This embodiment also modifies the surface of the first metal oxide particle in the positive electrode active material layer as in the first embodiment by processing the positive electrode. This yields the positive electrode active material as in the first embodiment in the positive electrode, thereby exhibiting the same effects as those of the first embodiment.

Method of Manufacturing Electrochemical Device

A method of manufacturing the other parts of the electrochemical device will now be explained in brief.

Negative Electrode

The negative electrode 20 can be manufactured by a known method. A specific example of the negative electrode current collector 22 is a copper foil. As the negative electrode active material layer 24, one containing a negative electrode active material, a conductive auxiliary, and a binder can be used. The conductive auxiliary and binder may be the same as those in the positive electrode.

Examples of the negative electrode active material include carbon materials such as graphite, non-graphitizable carbon, graphitizable carbon, and low-temperature-fired carbon which can occlude and release (intercalate and deintercalate or be doped and undoped with) lithium ions; metals such as Al, Si, and Sn which are combinable with lithium; compounds mainly composed of oxides such as $SiO_2$ and $SnO_2$; and particles containing lithium titanate ($Li_4Ti_5O_{12}$) and the like.

The method of manufacturing the negative electrode 20 may prepare a slurry and apply it to the current collector as in the method of manufacturing the positive electrode 10.

Electrochemical Device

The electrolytic solution, separator 18, case 50, and leads 60, 62 are prepared in addition to the above-mentioned positive and negative electrodes.

The electrolytic solution is one contained within the positive electrode active material layer 14, negative electrode active material layer 24, and separator 18. The electrolytic solution is not limited in particular. For example, an electrolytic solution (an aqueous solution or an electrolytic solution using an organic solvent) containing a lithium salt can be used in this embodiment. Since the tolerable voltage of aqueous electrolytic solutions during charging is limited to a low level because of their electrochemically low decomposition voltage, electrolytic solutions using organic solvents (nonaqueous electrolytic solutions) are preferred. As the electrolytic solution, one dissolving a lithium salt into a nonaqueous solvent (organic solvent) is preferably used. Examples of the lithium salt include salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, LiN(CF$_3$CF$_2$CO)$_2$, and LiBOB. These salts may be used either singly or in combinations of two or more.

Preferred examples of the organic solvent include propylene carbonate, ethylene carbonate, diethyl carbonate, and dimethyl carbonate. They may be used either singly or in combinations of two or more in arbitrary ratios.

In this embodiment, the electrolytic solution may be not only a liquid but also a gelled electrolyte obtained by adding a gelling agent thereto. A solid electrolyte (a solid polymer electrolyte or an electrolyte made of an ionically conductive inorganic material) may be contained in place of the electrolytic solution.

The separator 18 may be formed by an electrically insulating porous body. Its examples include extended films of monolayer or multilayer constituted by polyolefin such as polyethylene and polypropylene, extended films of mixture of the above polyolefin resins and fibrous nonwovens constituted by at least one kind of constituent material selected from the group consisting of cellulose, polyester, and polypropylene.

The case 50 is one which seals the multilayer body 30 and electrolytic solution therein. The case 50 is not limited in particular as long as it can inhibit the electrolytic solution from leaking out therefrom and moisture and the like from invading the lithium-ion secondary battery 100 from the outside. For example, as illustrated in FIG. 2, a metal-laminated film in which a metal foil 52 is coated with polymer films 54 on both sides can be utilized as the case 50. An aluminum foil or stainless foil can be used as the metal foil 52, for example. Preferred examples of the material for the outer polymer film 54 include polymers having a high melting point such as polyethylene terephthalate (PET) and polyamide. Preferred examples of the material for the inner polymer film 54 include polyethylene and polypropylene.

The leads 60, 62 are formed from a conductive material such as aluminum or nickel.

Known methods may be used to weld the leads 60, 62 to the negative electrode current collector 22 and positive electrode current collector 12, respectively, insert the positive electrode 10 and negative electrode 20 into the case 50 together with the electrolytic solution while holding the separator 18 between the positive electrode active material layer 14 and negative electrode active material layer 24, and then seal the inlet of the case 50.

The present invention can be modified in various ways without being restricted to the above-mentioned embodiments. For example, while the second metal oxide particle group 2 is formed on the surface of the first metal oxide particle 1 acting as the positive electrode active material in the above-mentioned embodiments, similar effects can be obtained when a negative electrode active material particle is a metal oxide by forming a similar second metal oxide particle group 2 on the first metal oxide particle acting as the negative electrode active material. Higher effects are obtained when the first metal oxide as the negative electrode active material is a metal oxide such as Li$_4$Ti$_5$O$_{12}$ or SiO$_x$ (x<2), for example.

Though the above-mentioned embodiments relate to secondary batteries, similar effects are obtained in electric double-layer capacitors and hybrid electric double-layer capacitors. Higher effects are obtained in the electric double-layer capacitors when using RuO$_2$ or the like as an active material, for example.

EXAMPLE A1

In Example A1, LiNi$_{1/3}$Mn$_{1/3}$Co$_{1/3}$O$_2$ was used as the first metal oxide of a positive electrode.

Surface Modification of the First Metal Oxide with a Zr Fluoro Complex

K$_2$ZrF$_6$ (manufactured by Junsei Chemical Co., Ltd.) and H$_3$BO$_3$ (manufactured by Kanto Chemical Co., Inc.) were dissolved into water so as to yield concentrations of 0.03 M and 0.05 M, respectively, in the resulting solution (which will hereinafter be referred to as "LPD solution") in a vessel made of polyethylene. To 800 ml of this solution in the polyethylene vessel, 120 g of LiNi$_{1/3}$Mn$_{1/3}$CO$_{1/3}$O$_2$ particles having an average particle size of 5 µm were added. They were stirred for 3 hr while being heated to 40° C., so as to react with each other. The lid of the polyethylene vessel was kept open during stirring.

The resulting dispersion liquid was filtered, so as to leave an active material in which a number of ZrO$_2$ particle groups were attached to the surfaces of the LiNi$_{1/3}$Mn$_{1/3}$Co$_{1/3}$O$_2$ particles. The pH of the filtrate was 6.4. The active material was washed with water, dried at 80° C., And heat-treated for 2 hr at 700° C. in the air atmosphere.

Figure 3:
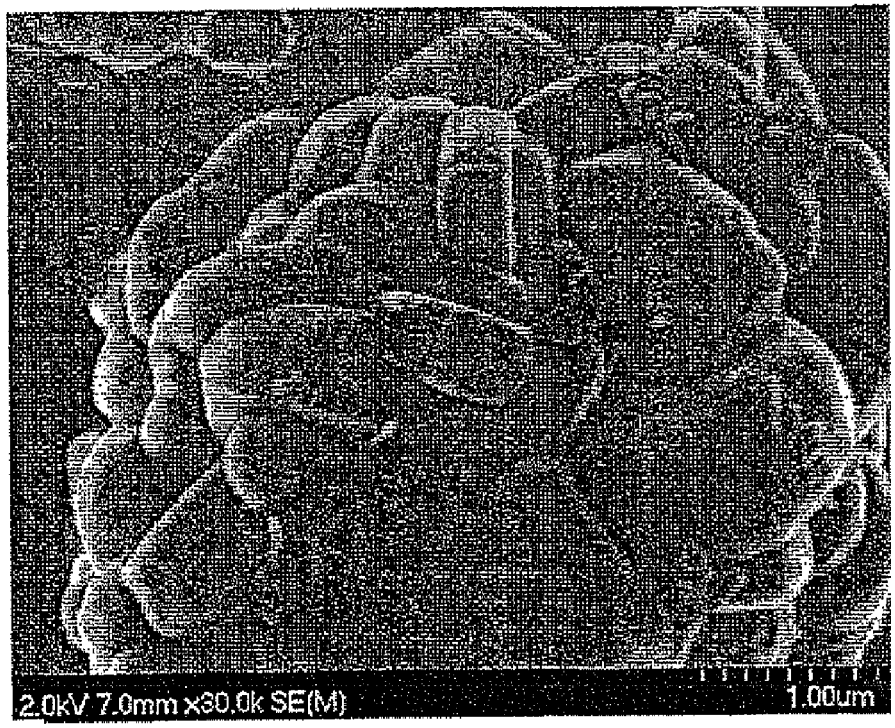
FIG. 3 is an SEM photograph of the active material obtained by Example A1.

The mass ratio of Zr in the positive electrode active material particles (LiNi$_{1/3}$Mn$_{1/3}$C$_{1/3}$O$_2$+ZrO$_2$) measured by ICP (inductively coupled plasma emission spectrometry) was 0.87 mass % when converted into the amount of ZrO$_2$. Fluorine in the positive electrode active material measured by steam distillation-ion chromatography was 0.36 mass %. Viewing the positive electrode active material with a scanning electron microscope (SEM) showed that the ZrO$_2$ particle groups were attached to the surfaces of the LiNi$_{1/3}$Mn$_{1/3}$Co$_{1/3}$O$_2$ particles as illustrated in FIG. 3. Viewing a cross section of the active material with a scanning transmission electron microscope (STEM) showed that ZrO$_2$ existed on the active material surface. Only Zr and O (oxygen) were detected when ZrO$_2$ was analyzed by an EDS (energy dispersive X-ray spectrometer) attached to the STEM.

Figure 4:
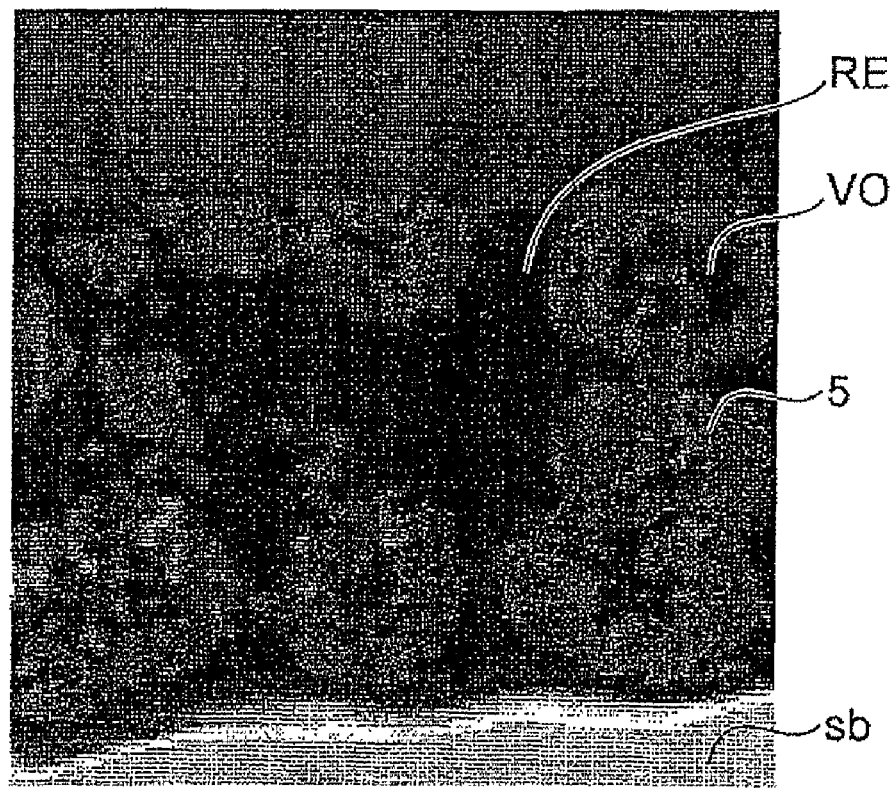
FIG. 4 is an SEM image of an area of 20 μm×20 μm in a cross section of the active material obtained by Example A1.
Figure 5:
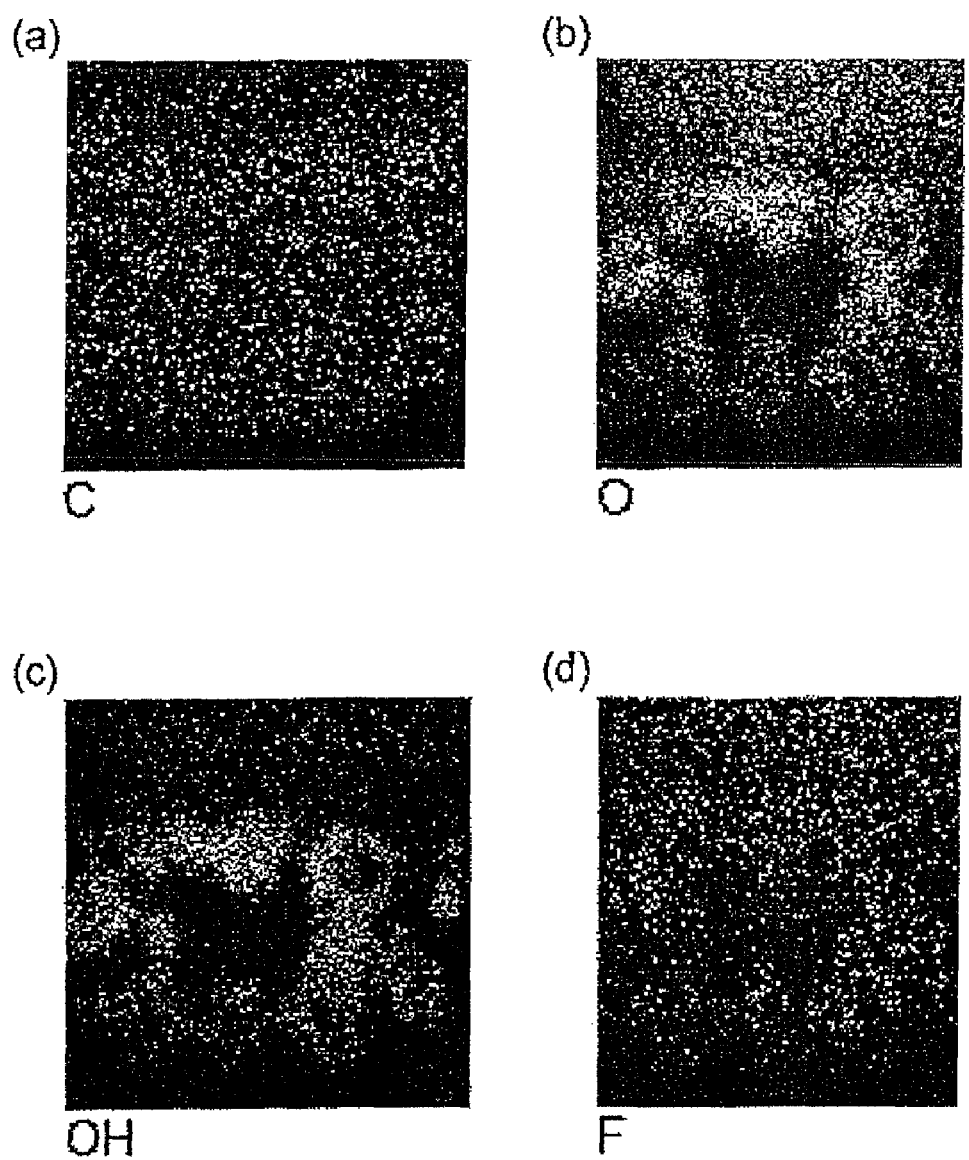
FIG. 5 is a TOF-SIMS image in the same field of view as that of FIG. 4, in which (a) to (d) represent C, O, OH, and F, respectively.
Figure 6:
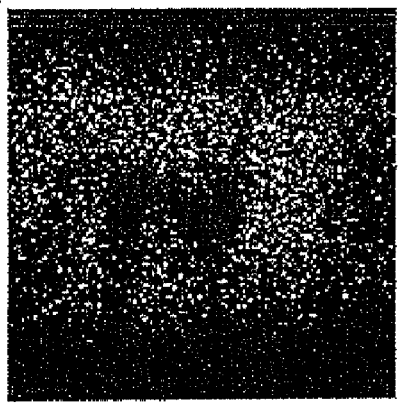
FIG. 6 is a TOF-SIMS image in the same field of view as that of FIG. 4, in which (a) to (d) represent $^6Li$, $^7Li$, $Li_2F$, and K, respectively.
Figure 6:
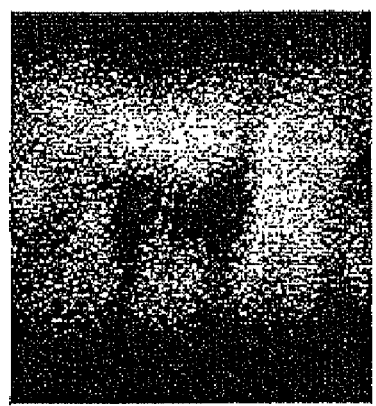
Figure 6:
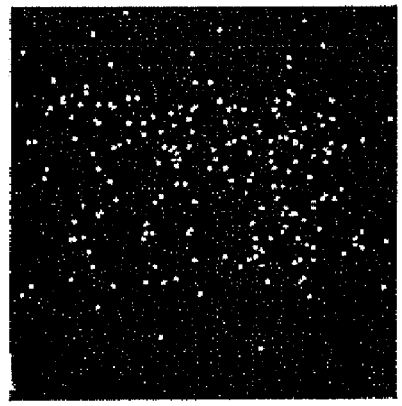
Figure 6:
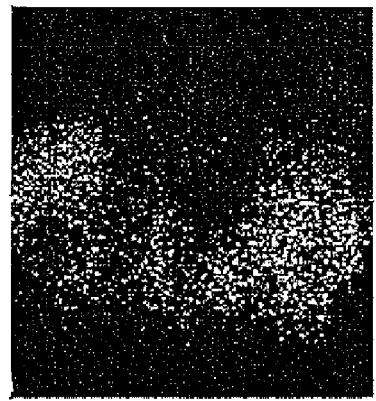
Figure 7:
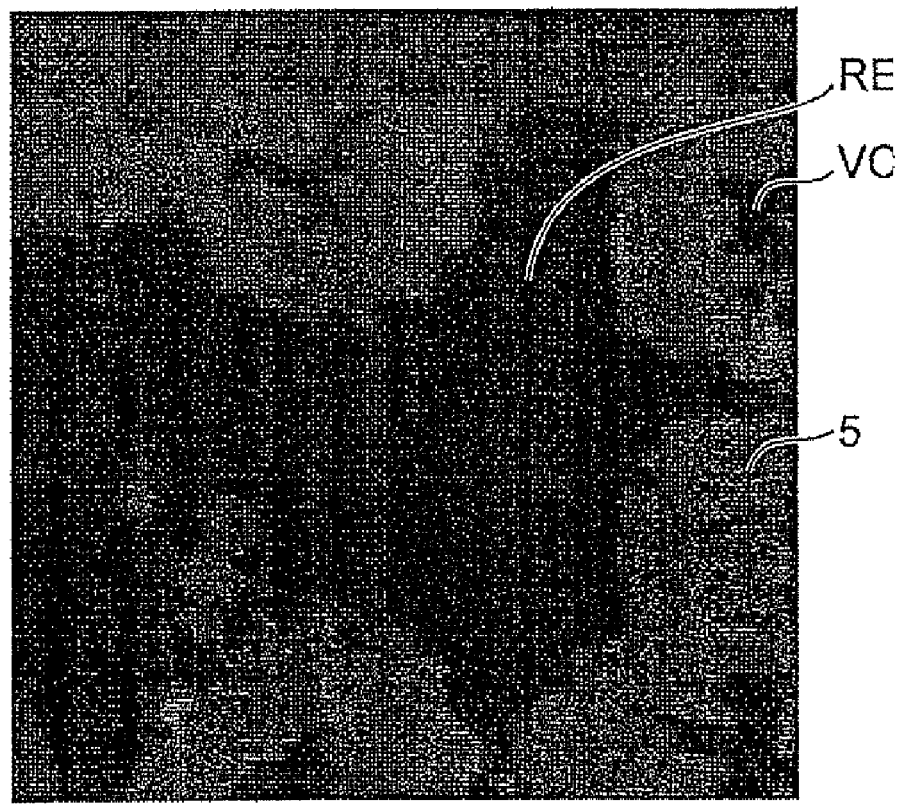
FIG. 7 is an SEM image of an area of 10 μm×10 μm, which is a part different from that of FIG. 4, in the cross section of the active material obtained by Example A1.
Figure 8:
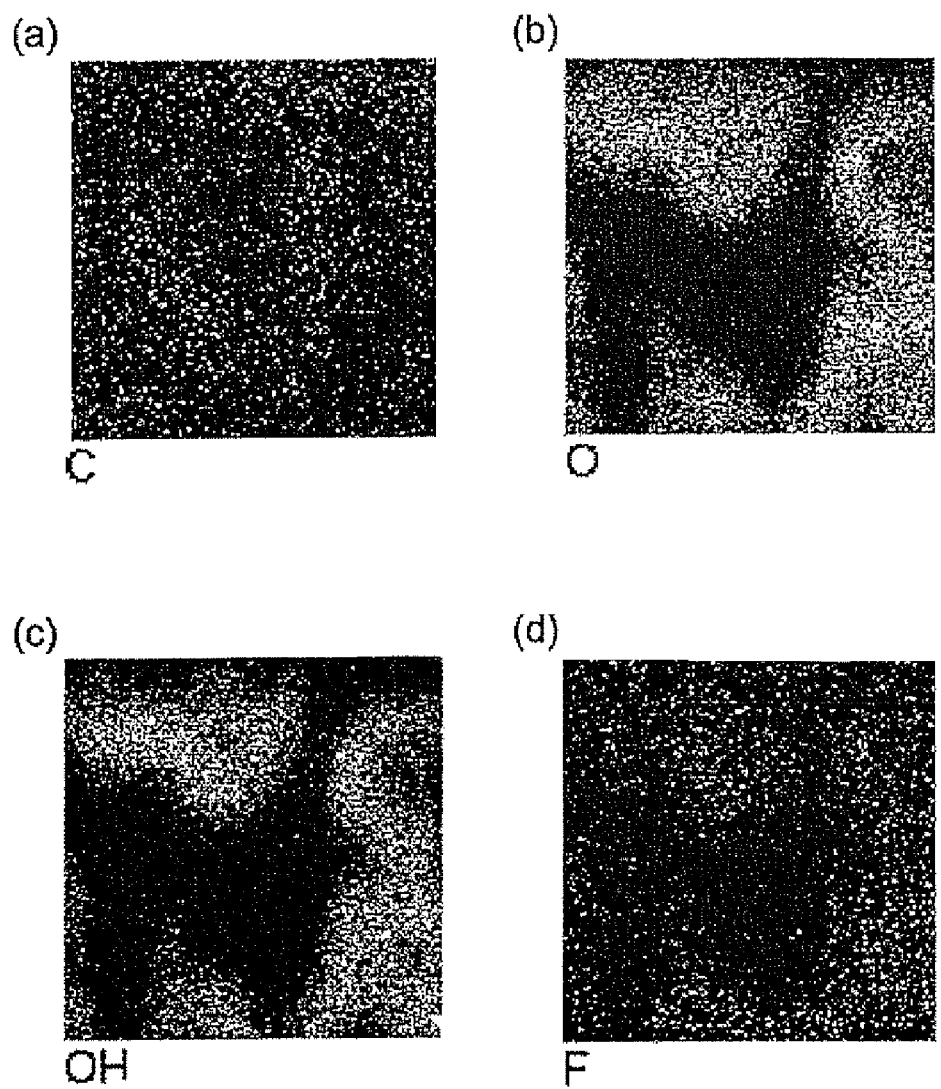
FIG. 8 is a TOF-SIMS image in the same field of view as that of FIG. 7, in which (a) to (d) represent C, O, OH, and F, respectively.
Figure 9:
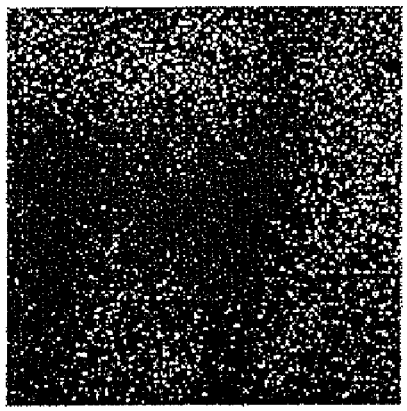
FIG. 9 is a TOF-SIMS image in the same field of view as that of FIG. 7, in which (a) to (d) represent $^6Li$, $^7Li$, $Li_2F$, and K, respectively.
Figure 9:
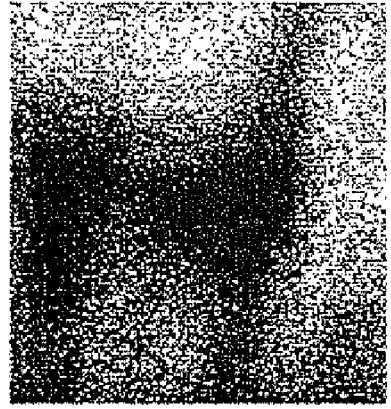
Figure 9:
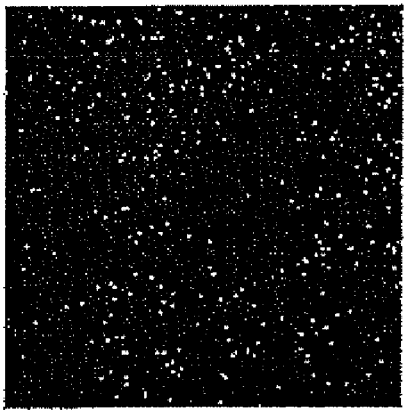
Figure 9:
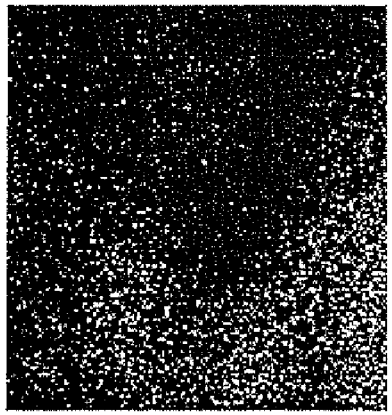

A cross section of the active material was analyzed by TOF-SIMS (Time-Of-Flight Secondary Ion Mass Spectrometry). The TOF-SIMS system employed was TOF-SIMS-5 manufactured by ION-TOF GmbH. FIGS. 4 to 9 illustrate the results. As illustrated in FIGS. 4 to 9, fluorine was seen to exist throughout the active material. FIGS. 4 to 6 are images of the same place in an area of 20 µm×20 µm in the cross section of thus obtained active material. FIG. 4 is an SEM image, while FIGS. 5 and 6 are TOF-SIMS images. In FIGS. 4, 5 is the active material, VO a void in the active material, sb a silicon substrate, and RE an embedding resin. In view of FIG. 4, the F image in FIG. 5, and the Li$_2$F image in FIG. 6, fluorine was seen to exist throughout the active material. FIGS. 7 to 9 are images in an area of 10 µm×10 µm in a different place of the same sample. FIG. 7 is an SEM image, while FIGS. 8 and 9 are TOF-SIMS images. Fluorine was seen to exist throughout the active material from these images as well.

The active material was further analyzed by solid-state NMR (nuclear magnetic resonance). The solid-state NMR system employed was AVANCE400 manufactured by Bruker Corp. The measuring method was MAS (Magic Angle Spinning) with a measurement angular frequency of 376.4575530 MHz ($^{19}$F nucleus), a spectrum width of 200 kHz, a pulse width of 3.0 µsec (90° pulse) or 1.0 µsec (30° pulse), a pulse repetition time of 15 to 30 sec, 4096 observation points, a standard material of hexafluorobenzene group (external standard: −163 ppm), a measurement temperature of room temperature (about 22° C.), and a sample rotation of 18 kHz.

Figure 10:
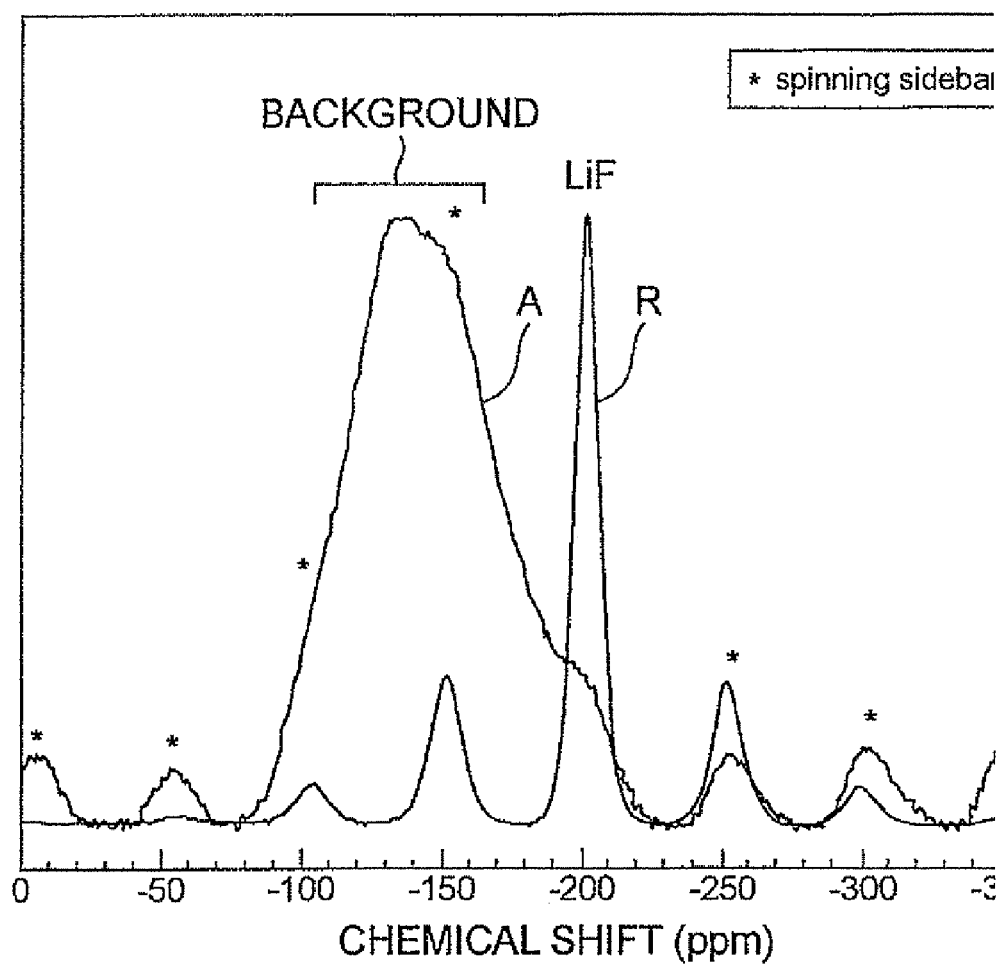
FIG. 10 is a graph illustrating results of solid-state NMR of the active material in Example A1.

FIG. 10 illustrates the results of solid-state NMR. In FIG. 10, the measurement result A of the active material and the measurement result R of LiF as a standard sample are overlaid on each other. The peak centered near 140 ppm in the measurement result A was the background. A peak was seen in a part located at a shoulder of the background. While the peak position of the measurement result R (LiF) was −201.42 ppm, the peak position of the measurement result A (active material) was −201.54 ppm, which was very close to the former. As in the standard sample, spinning sidebands (indicated by *) were detected at intervals proportional to the sample rotation on both sides of the peak at about −200 ppm in the measurement result A. These results showed that fluorine in the active material is in a state closer to F of LiF. That is, it was seen that fluorine in the active material was F$^-$, which existed as a counterion for any of Li$^+$, Ni$^{2+\ to\ 4+}$, Mn$^{4+}$, and Co$^{3+\ to\ 4+}$ that were cations constituting the active material, and that fluorine was substantially combined with the active material. In light of the foregoing, the active material was seen to have the structure illustrated in FIG. 1.

Making of Battery Electrodes

Making of a Positive Electrode

Using the positive electrode active material produced as in the foregoing as a battery active material, CB (carbon black manufactured by Denki Kagaku Kogyo K.K. under the name of DAB50) and graphite (KS-6 manufactured by TIMCAL) as a conductive auxiliary, and PVDF as a binder, a positive electrode was made. An NMP (N-methyl-2-pyrrolidinone) solution of PVDF (KF7305 manufactured by Kureha Corp.) was added to and mixed with the positive electrode active material, CB, and graphite, so as to make a coating material. This coating material was applied by doctor blading to an aluminum foil (having a thickness of 20 μm) acting as a current collector, dried (at 100° C.), and rolled.

Making of a Negative Electrode

Using natural graphite as a battery active material, CB as a conductive auxiliary, and PVDF as a binder, a negative electrode was made. KF7305 was added to and mixed with natural graphite and CB, so as to make a coating material. This coating material was applied by doctor blading to a copper foil (having a thickness of 16 μm) acting as a current collector, dried (at 90° C.), and rolled.

Making of a Battery

The positive and negative electrodes made as mentioned above and a separator (microporous film made of polyolefin) were cut into predetermined sizes. For welding outer lead terminals, each of the positive and negative electrodes was partly left uncoated with the electrode coating material (active material+conductive auxiliary+binder). The positive electrode, separator, and negative electrode were laminated in this order. At the time of laminating, a small amount of a hotmelt adhesive (ethylene/methacrylic acid copolymer; EMAA) was applied to the positive electrode, negative electrode, and separator so as to secure them such that they do not shift from each other. An aluminum foil (4 mm (W)×40 mm (L)×80 μm (T)) and a nickel foil (4 mm (W)×40 mm (L)×80 μm (T)) were ultrasonically welded to the positive and negative electrodes, respectively, as outer lead terminals. Polypropylene (PP) grafted with maleic anhydride was wound about and thermally bonded to each of the outer lead terminals. This aims to improve the sealability between each outer terminal and an outer package. Prepared as an outer package of the battery was one made of an aluminum laminate material having a structure of PET(12)/Al(40)/PP(50). PET and PP refer to polyethylene terephthalate and polypropylene, respectively. The parenthesized numbers represent thicknesses of their corresponding layers (in the unit of μm). Here, a bag was made such that PP faces the inside. The battery elements were put into the outer package of the battery, an appropriate amount of an electrolytic solution (a mixed solution of ethylene carbonate (EC) and diethyl carbonate (DEC) (EC:DEC=30:70 vol %) containing 1 M of LiPF$_6$ dissolved therein) was added thereto, and the outer package of the battery was sealed in vacuum, so as to make an electrochemical device (lithium-ion secondary battery having a nominal capacity of 350 mAh).

EXAMPLES A2 to A6

The positive electrode active materials and batteries of Examples A2 to A6 were made as in Example A1 except that the concentrations of K$_2$ZrF$_6$ and H$_3$BO$_3$ in the LPD solution were changed as listed in Table 1.

EXAMPLES A7 and A8

The positive electrode active materials and batteries of Examples A7 and A8 were made as in Example A5 except that 60 g and 40 g of the first metal oxide particles were compounded therein, respectively.

EXAMPLES A9 to A13

The positive electrode active materials and batteries of Examples A9 to A13 were made as in Example A1 except that the first metal oxide particles were brought into contact with the LPD solution in a closed polyethylene vessel and that the supplied amount of the first metal oxide particles and the concentration of K$_2$ZrF$_6$ in the LPD solution were changed as listed in Table 1.

EXAMPLES A14 to A19

The positive electrode active materials and batteries of Examples A14 to A19 were made as in Example A5 except that the first metal oxide was changed as listed in Table 1.

EXAMPLES B1 to B8

The positive electrode active materials and batteries of Examples B1 to B8 were made as in Example A1 except that (NH$_4$)$_2$SiF$_6$ was used in place of K$_2$ZrF$_6$ and that the concentration of (NH$_4$)$_2$SiF$_6$ in the LPD solution and the supplied amount of the first metal oxide particles were changed as listed in Table 2.

EXAMPLES C1 to C8

The positive electrode active materials and batteries of Examples C1 to C8 were made as in Example A1 except that SnF$_2$ was used in place of K$_2$ZrF$_6$ and that the concentration of SnF$_2$ in the LPD solution and the supplied amount of the first metal oxide particles were changed as listed in Table 3.

COMPARATIVE EXAMPLE 1

Figure 11:
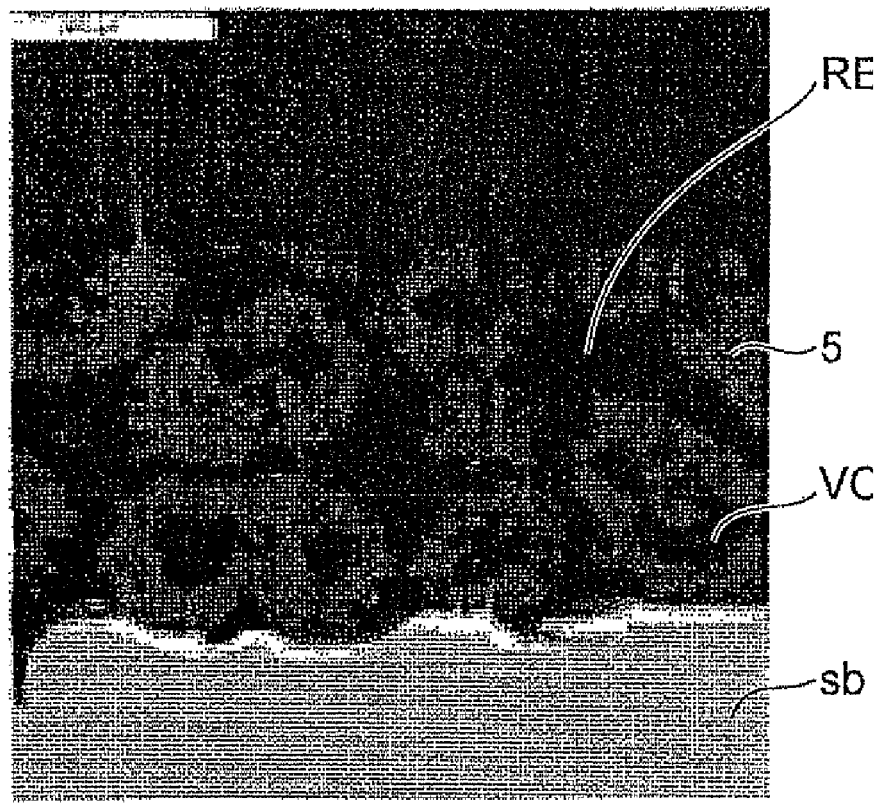
FIG. 11 is an SEM image of an area of 10 μm×10 μm in a cross section of the active material obtained by Comparative Example 1.
Figure 12:
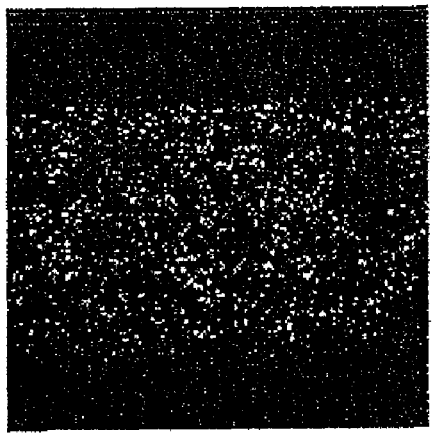
FIG. 12 is a TOF-SIMS image in the same field of view as that of FIG. 11, in which (a) to (d) represent C, O, OH, and F, respectively.
Figure 12:
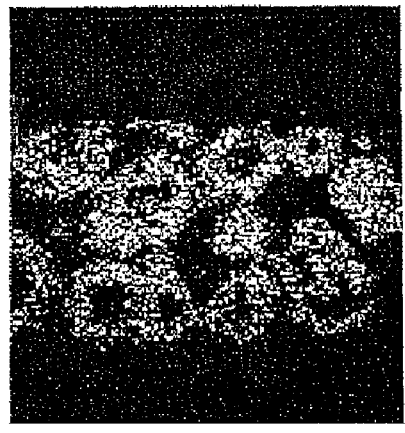
Figure 12:
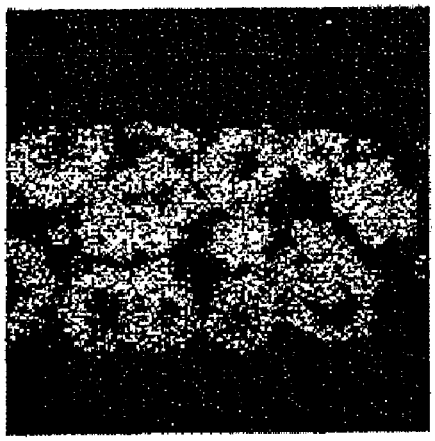
Figure 12:
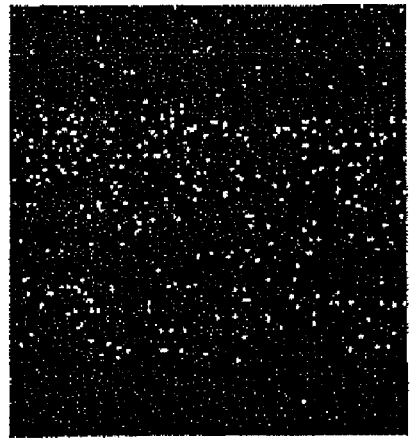
Figure 13:
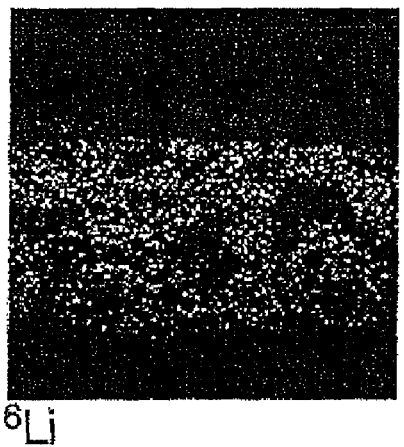
FIG. 13 is a TOF-SIMS image in the same field of view as that of FIG. 11, in which (a) to (d) represent $^6Li$, $^7Li$, $Li_2F$, and K, respectively.
Figure 13:
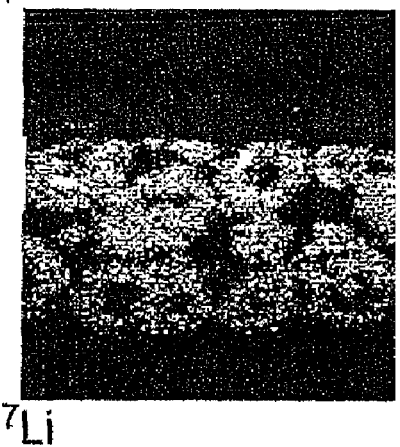
Figure 13:
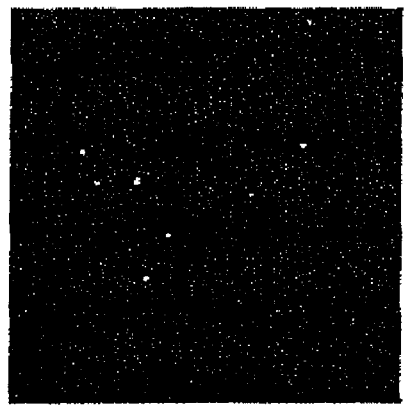
Figure 13:
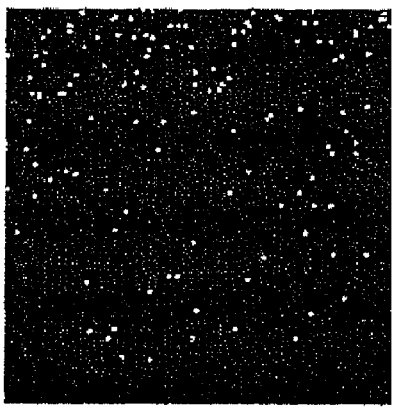
Figure 14:
FIG. 14 is an SEM image of an area of 10 μm×10 μm, which is a part different from that of FIG. 11, in the cross section of the active material obtained by Comparative Example 1.
Figure 15:
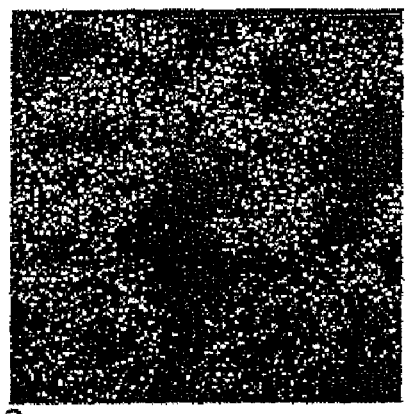
FIG. 15 is a TOF-SIMS image in the same field of view as that of FIG. 14, in which (a) to (d) represent $^6Li$, $Li_2F$, and K, respectively.
Figure 15:
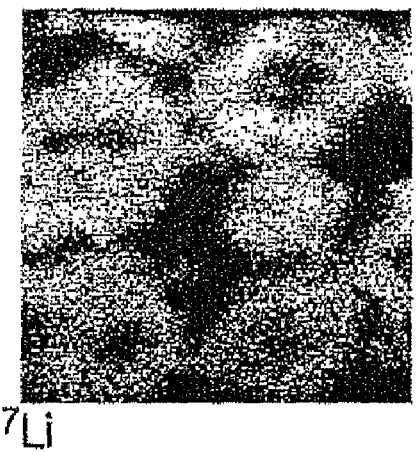
Figure 15:
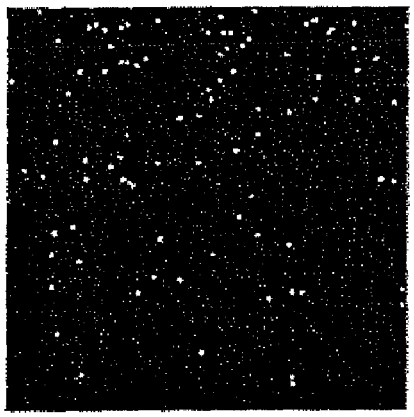
Figure 15:
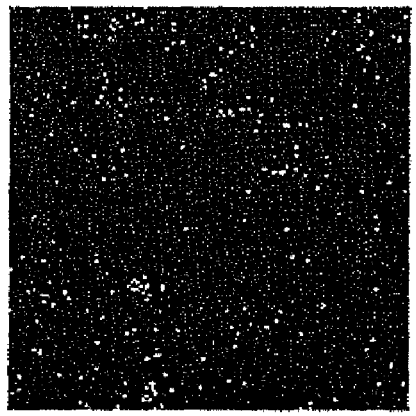

A battery was obtained as in Example 1 except that a positive electrode active material not in contact with the LPD solution yet was used. A cross section of this positive electrode active material was analyzed by the TOF-SIMS as in Example 1. FIGS. 11 to 15 illustrate the results. FIGS. 11 to 13 are images of the same place in an area of 20 μm×20 μm in the cross section of the obtained active material. FIG. 11 is an SEM image, while FIGS. 12 and 13 are TOF-SIMS images. In view of FIG. 11, the F image in FIG. 12, and the Li$_2$F image in FIG. 13, it was seen that fluorine hardly existed. FIGS. 14 and 15 are images in an area of 10 μm×10 μm in a different place in the cross section of the obtained active material. FIG.

14 is an SEM image, while FIG. 15 is a TOF-SIMS image. These images also show that fluorine hardly existed.

COMPARATIVE EXAMPLE 2

A positive electrode active material and a battery were obtained as in Example 3 except that the LPD solution and the first metal oxide particles were brought into contact with each other in a glass vessel.

COMPARATIVE EXAMPLE 3

In a vessel made of polyethylene, 800 ml of an ethanol solution containing 0.01 M of $NH_4PF_6$ (manufactured by Wako Pure Chemical Industries, Ltd.) and 120 g of $LiNi_{1/3}Mn_{1/3}Co_{1/3}O_2$ were brought into contact with each other and stirred at room temperature until ethanol evaporated away. Thus obtained active material was dried at 80° C., so as to fully evaporate ethanol, and heat-treated for 2 hr at 700° C. in the air, so as to yield a positive electrode active material. Except for these points, the same procedure as that of Example 1 was taken.

COMPARATIVE EXAMPLE 4

The same procedure as that of Example 1 was taken except for using $Zr(OC_2H_5)_4$ instead of $NH_4PF_6$ (manufactured by Wako Pure Chemical Industries, Ltd.).

In Comparative Examples 2 to 4, fluorine was not added to the deepest part of the first metal oxide particles. In particular, fluorine seems to have been consumed by the glass vessel in Comparative Example 2.

Evaluation: Overcharging Test

Thus obtained batteries were charged to 10 V at 1 C, and their states after charging and maximum attained temperatures were measured.

Tables 1 to 6 list these conditions and results.

TABLE 1

| Example | Vessel | 1st metal oxide particle | 1st metal oxide particle amount/g | LPD solution conc. $K_2ZrF_6$/M | LPD solution conc. $H_3BO_3$/M | Active material after processing $ZrO_2$/wt% | Active material after processing F/wt% | LPD solution pH after processing | Overcharging test After-test state | Overcharging test Max Attained temp./°C |
|---|---|---|---|---|---|---|---|---|---|---|
| A1 | polyethylene | $LiNi_{1/3}Mn_{1/3}Co_{1/3}O_2$ | 120 | 0.03 | 0.05 | 0.87 | 0.36 | 6.4 | no rupture/ignition/explosion | 40 |
| A2 | polyethylene | $LiNi_{1/3}Mn_{1/3}Co_{1/3}O_2$ | 120 | 0.008 | 0.05 | 0.45 | 0.04 | 6.5 | no rupture/ignition/explosion | 100 |
| A3 | polyethylene | $LiNi_{1/3}Mn_{1/3}Co_{1/3}O_2$ | 120 | 0.01 | 0.05 | 0.50 | 0.045 | 6.9 | no rupture/ignition/explosion | 90 |
| A4 | polyethylene | $LiNi_{1/3}Mn_{1/3}Co_{1/3}O_2$ | 120 | 0.02 | 0.05 | 0.61 | 0.15 | 6.7 | no rupture/ignition/explosion | 80 |
| A5 | polyethylene | $LiNi_{1/3}Mn_{1/3}Co_{1/3}O_2$ | 120 | 0.04 | 0.05 | 0.97 | 0.42 | 6.5 | no rupture/ignition/explosion | 40 |
| A6 | polyethylene | $LiNi_{1/3}Mn_{1/3}Co_{1/3}O_2$ | 120 | 0.002 | 0.05 | 0.10 | 0.01 | 6.4 | no rupture/ignition/explosion | 120 |
| A7 | polyethylene | $LiNi_{1/3}Mn_{1/3}Co_{1/3}O_2$ | 40 | 0.04 | 0.05 | 3.00 | 1.20 | 6.4 | no rupture/ignition/explosion | 40 |
| A8 | polyethylene | $LiNi_{1/3}Mn_{1/3}Co_{1/3}O_2$ | 30 | 0.04 | 0.05 | 3.50 | 1.60 | 6.3 | no rupture/ignition/explosion | 120 |
| A9 | polyethylene/closed | $LiNi_{1/3}Mn_{1/3}Co_{1/3}O_2$ | 120 | 0.001 | 0.05 | 0.05 | 0.04 | 6.4 | no rupture/ignition/explosion | 120 |
| A10 | polyethylene/closed | $LiNi_{1/3}Mn_{1/3}Co_{1/3}O_2$ | 120 | 0.03 | 0.05 | 0.87 | 1.00 | 6.4 | no rupture/ignition/explosion | 40 |
| A11 | polyethylene/closed | $LiNi_{1/3}Mn_{1/3}Co_{1/3}O_2$ | 120 | 0.04 | 0.05 | 0.97 | 2.00 | 6.5 | no rupture/ignition/explosion | 40 |
| A12 | polyethylene/closed | $LiNi_{1/3}Mn_{1/3}Co_{1/3}O_2$ | 60 | 0.04 | 0.05 | 2.00 | 2.00 | 6.5 | no rupture/ignition/explosion | 40 |
| A13 | polyethylene/closed | $LiNi_{1/3}Mn_{1/3}Co_{1/3}O_2$ | 40 | 0.04 | 0.05 | 3.00 | 2.40 | 6.3 | no rupture/ignition/explosion | 120 |
| A14 | polyethylene | $LiNi_{0.79}Co_{0.19}Al_{0.02}O_2$ | 120 | 0.04 | 0.05 | 0.97 | 0.32 | 6.9 | no rupture/ignition/explosion | 40 |
| A15 | polyethylene | $LiNi_{0.85}Co_{0.15}O_2$ | 120 | 0.04 | 0.05 | 0.95 | 0.30 | 6.7 | no rupture/ignition/explosion | 40 |
| A16 | polyethylene | $LiCoO_2$ | 120 | 0.04 | 0.05 | 0.97 | 0.32 | 6.9 | no rupture/ignition/explosion | 40 |
| A17 | polyethylene | $LiNi_{3/10}Mn_{4/10}Co_{3/10}O_2$ | 120 | 0.04 | 0.05 | 0.97 | 0.32 | 6.9 | no rupture/ignition/explosion | 40 |
| A18 | polyethylene | $LiNi_{4/10}Mn_{4/10}Co_{2/10}O_2$ | 120 | 0.04 | 0.05 | 0.97 | 0.32 | 6.9 | no rupture/ignition/explosion | 115 |
| A19 | polyethylene | $LiMn_2O_4$ | 120 | 0.04 | 0.05 | 0.80 | 0.25 | 6.0 | no rupture/ignition/explosion | 40 |

TABLE 2

| Example | Vessel | 1st metal oxide particle | 1st metal oxide particle amount/g | LPD solution conc. (NH$_4$)$_2$SiF$_6$/M | LPD solution conc. H$_3$BO$_3$/M | Active material after processing SiO$_2$/wt % | Active material after processing F/wt % | LPD solution pH after processing | Overcharging test After-test state | Overcharging test Max Attained temp./° C. |
|---|---|---|---|---|---|---|---|---|---|---|
| B1 | polyethylene | LiNi$_{1/3}$Mn$_{1/3}$Co$_{1/3}$O$_2$ | 120 | 0.002 | 0.05 | 0.08 | 0.04 | 6.7 | no rupture/ignition/explosion | 120 |
| B2 | polyethylene | LiNi$_{1/3}$Mn$_{1/3}$Co$_{1/3}$O$_2$ | 120 | 0.01 | 0.05 | 0.40 | 0.15 | 6.1 | no rupture/ignition/explosion | 80 |
| B3 | polyethylene | LiNi$_{1/3}$Mn$_{1/3}$Co$_{1/3}$O$_2$ | 120 | 0.02 | 0.05 | 0.70 | 0.30 | 6.0 | no rupture/ignition/explosion | 60 |
| B4 | polyethylene | LiNi$_{1/3}$Mn$_{1/3}$Co$_{1/3}$O$_2$ | 120 | 0.03 | 0.05 | 1.00 | 0.40 | 5.9 | no rupture/ignition/explosion | 40 |
| B5 | polyethylene | LiNi$_{1/3}$Mn$_{1/3}$Co$_{1/3}$O$_2$ | 120 | 0.04 | 0.05 | 1.50 | 0.60 | 5.9 | no rupture/ignition/explosion | 40 |
| B6 | polyethylene | LiNi$_{1/3}$Mn$_{1/3}$Co$_{1/3}$O$_2$ | 40 | 0.04 | 0.05 | 3.00 | 2.50 | 5.0 | no rupture/ignition/explosion | 120 |
| B7 | polyethylene | LiNi$_{1/3}$Mn$_{1/3}$Co$_{1/3}$O$_2$ | 60 | 0.005 | 0.05 | 0.10 | 0.04 | 6.5 | no rupture/ignition/explosion | 100 |
| B8 | polyethylene | LiNi$_{1/3}$Mn$_{1/3}$Co$_{1/3}$O$_2$ | 60 | 0.03 | 0.05 | 2.00 | 0.75 | 5.5 | no rupture/ignition/explosion | 40 |

TABLE 3

| Example | Vessel | 1st metal oxide particle | 1st metal oxide particle amount/g | LPD solution conc. SnF$_2$/M | LPD solution conc. H$_3$BO$_3$/M | Active material after processing SnO$_2$/wt % | Active material after processing F/wt % | LPD solution pH after processing | Overcharging test After-test state | Overcharging test Max Attained temp./° C. |
|---|---|---|---|---|---|---|---|---|---|---|
| C1 | polyethylene | LiNi$_{1/3}$Mn$_{1/3}$Co$_{1/3}$O$_2$ | 120 | 0.008 | 0.05 | 0.12 | 0.04 | 6.6 | no rupture/ignition/explosion | 100 |
| C2 | polyethylene | LiNi$_{1/3}$Mn$_{1/3}$Co$_{1/3}$O$_2$ | 120 | 0.01 | 0.05 | 0.20 | 0.05 | 4.9 | no rupture/ignition/explosion | 80 |
| C3 | polyethylene | LiNi$_{1/3}$Mn$_{1/3}$Co$_{1/3}$O$_2$ | 120 | 0.02 | 0.05 | 0.40 | 0.10 | 4.8 | no rupture/ignition/explosion | 60 |
| C4 | polyethylene | LiNi$_{1/3}$Mn$_{1/3}$Co$_{1/3}$O$_2$ | 120 | 0.03 | 0.05 | 0.60 | 0.15 | 4.7 | no rupture/ignition/explosion | 40 |
| C5 | polyethylene | LiNi$_{1/3}$Mn$_{1/3}$Co$_{1/3}$O$_2$ | 120 | 0.04 | 0.05 | 0.80 | 0.20 | 4.6 | no rupture/ignition/explosion | 40 |
| C6 | polyethylene | LiNi$_{1/3}$Mn$_{1/3}$Co$_{1/3}$O$_2$ | 15 | 0.04 | 0.05 | 3.00 | 2.50 | 4.3 | no rupture/ignition/explosion | 120 |
| C7 | polyethylene | LiNi$_{1/3}$Mn$_{1/3}$Co$_{1/3}$O$_2$ | 120 | 0.005 | 0.05 | 0.10 | 0.03 | 6.7 | no rupture/ignition/explosion | 120 |
| C8 | polyethylene | LiNi$_{1/3}$Mn$_{1/3}$Co$_{1/3}$O$_2$ | 30 | 0.04 | 0.05 | 2.00 | 0.90 | 4.3 | no rupture/ignition/explosion | 40 |

TABLE 4

| Comparative Example | Vessel | 1st metal oxide particle | 1st metal oxide particle amount/g | LPD solution conc. K$_2$ZrF$_6$/M | LPD solution conc. H$_3$BO$_3$/M | Active material after processing ZrO$_2$/wt % | Active material after processing F/wt % | LPD solution pH after processing | Overcharging test After-test state | Overcharging test Max-Attained temp./° C. |
|---|---|---|---|---|---|---|---|---|---|---|
| 1 | — | LiNi$_{1/3}$Mn$_{1/3}$Co$_{1/3}$O$_2$ | 120 | — | — | — | — | — | exploded | unmeasurable |
| 2 | glass | LiNi$_{1/3}$Mn$_{1/3}$Co$_{1/3}$O$_2$ | 120 | 0.01 | 0.05 | 0.50 | 0.01 | 6.9 | exploded | unmeasurable |

TABLE 5

| Comparative Example | Vessel | 1st metal oxide particle | 1st metal oxide particle amount/g | solution conc. NH$_4$PF$_6$/M | solution conc. H$_3$BO$_3$/M | Active material after processing ZrO$_2$/ wt % | Active material after processing F/ wt % | solution pH after processing | Overcharging test After-test state | Overcharging test Max Attained temp./° C. |
|---|---|---|---|---|---|---|---|---|---|---|
| 3 | polyethylene | LiNi$_{1/3}$Mn$_{1/3}$Co$_{1/3}$O$_2$ | 120 | 0.01 | — | — | 0.44 | 8.0 | exploded | unmeasurable |

TABLE 6

| Comparative Example | Vessel | 1st metal oxide particle | 1st metal oxide particle amount/g | solution conc. Zr(OC$_2$H$_5$)$_4$/M | solution conc. H$_3$BO$_3$/M | Active material after processing ZrO$_2$/ wt % | Active material after processing F/ wt % | solution pH after processing | Overcharging test After-test state | Overcharging test Max Attained temp./° C. |
|---|---|---|---|---|---|---|---|---|---|---|
| 4 | glass | LiNi$_{1/3}$Mn$_{1/3}$Co$_{1/3}$O$_2$ | 120 | 0.01 | — | 0.32 | — | 8.0 | exploded | unmeasurable |

REFERENCE SIGNS LIST

1 . . . first metal oxide particle; 2 . . . second metal oxide particle group; 5 . . . active material; 10 . . . positive electrode (electrode); 14 . . . positive electrode active material layer (active material layer)

What is claimed is:

1. An active material for a battery comprising a particle of a first metal oxide and a particle group of a second metal oxide attached to a surface of the particle of the first metal oxide;
   wherein the second metal oxide is at least one selected from the group consisting of zirconia, silica, and tin oxide; and
   wherein the particle of the first metal oxide contains fluorine atoms from a surface thereof to a deepest part thereof;
   wherein the fluorine content is 0.04 to 2.0 mass % in the total mass of the particle of the first metal oxide and the particle group of the second metal oxide; and
   wherein the particle group of the second metal oxide is 0.1 to 3.0 mass % in the total mass of the particle of the first metal oxide and the particle group of the second metal oxide.

2. The active material according to claim 1, wherein the particle of the first metal oxide exhibits a peak of −201.54 ppm±10 ppm when a $^{19}$F nucleus thereof is measured by solid-state NMR.

3. The active material according to claim 1, wherein the first metal oxide is a lithium-containing metal oxide.

4. The active material according to claim 1, wherein the first metal oxide is LiMn$_{2-x}$Al$_x$O$_4$ (where $0 \leq x < 2$), LiCo$_x$Ni$_y$Mn$_{1-x-y}$O$_2$ (where $0 \leq x \leq 1$ and $0 < y \leq 0.36$), or LiNi$_x$Co$_y$Al$_{1-x-y}$O$_2$ (where $0 < x \leq 1$ and $0 \leq y < 1$).

5. The electrode having the active material according to claim 1.

* * * * *